Figure 1:
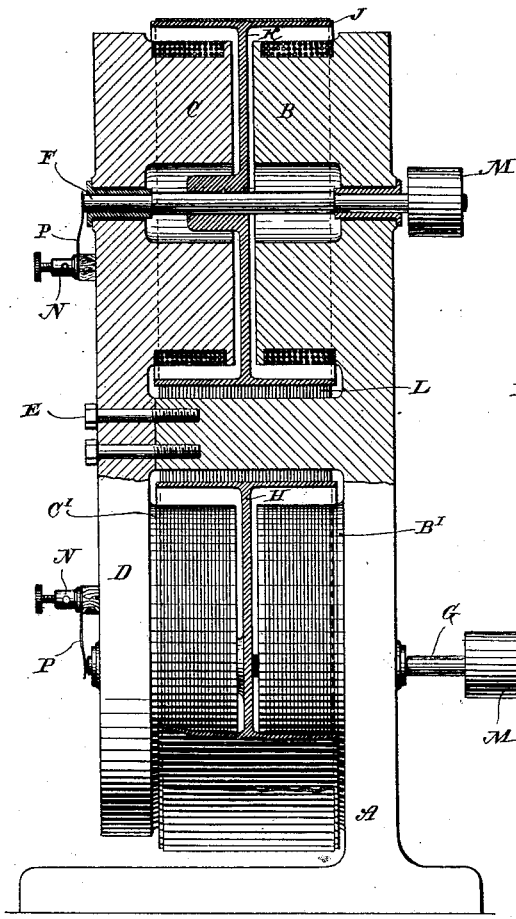

(No Model.)

N. TESLA.
DYNAMO ELECTRIC MACHINE.

No. 406,968. Patented July 16, 1889.

Witnesses:
Robt. F. Gaylord
Ernest Hopkinson

Inventor
Nikola Tesla
by
Duncan, Curtis & Page.
Attorneys.

UNITED STATES PATENT OFFICE.

NIKOLA TESLA, OF NEW YORK, N. Y., ASSIGNOR OF TWO-THIRDS TO CHARLES F. PECK, OF ENGLEWOOD, NEW JERSEY, AND ALFRED S. BROWN, OF NEW YORK, N. Y.

DYNAMO-ELECTRIC MACHINE.

SPECIFICATION forming part of Letters Patent No. 406,968, dated July 16, 1889.

Application filed March 23, 1889. Serial No. 304,498. (No model.)

*To all whom it may concern:*

Be it known that I, NIKOLA TESLA, from Smiljan, Lika, border country of Austria-Hungary, a subject of the Emperor of Austria, and a resident of New York, in the county and State of New York, have invented certain new and useful Improvements in Dynamo or Magneto Electric Machines, of which the following is a specification, reference being had to the accompanying drawings.

This invention relates to that class of electrical generators known as "unipolar," in which a disk or cylindrical conductor is mounted between magnetic poles adapted to produce an approximately-uniform field. In the first-named or disk armature machines the currents induced in the rotating conductor flow from the center to periphery, or conversely, according to the direction of rotation or the lines of force as determined by the signs of the magnetic poles, and these currents are taken off usually by connections or brushes applied to the disk at points on its periphery and near its center. In the case of the cylindrical armature-machine the currents developed in the cylinder are taken off by brushes applied to the sides of the cylinder at its ends.

In order to develop economically an electro-motive force available for practicable purposes, it is necessary either to rotate the conductor at a very high rate of speed or to use a disk of large diameter or cylinder of great length; but in either case it becomes difficult to secure and maintain a good electrical connection between the collecting-brushes and the conductor, owing to the high peripheral speed.

It has been proposed to couple two or more disks together in series with the object of obtaining a higher electro-motive force; but with the connections heretofore used and using other conditions of speed and dimension of disk necessary to securing good practicable results this difficulty is still felt to be a serious obstacle to the use of this kind of generator. These objections I have sought to avoid; and for this purpose I construct a machine with two fields, each having a rotary conductor mounted between its poles, but the same principle is involved in the case of both forms of machine above described, and as I prefer to use the disk form I shall confine the description herein to that machine. The disks are formed with flanges, after the manner of pulleys, and are connected together by flexible conducting bands or belts.

I prefer to construct the machine in such manner that the direction of magnetism or order of the poles in one field of force is opposite to that in the other, so that rotation of the disks in the same direction develops a current in one from center to circumference and in the other from circumference to center. Contacts applied therefore to the shafts upon which the disks are mounted form the terminals of a circuit the electro-motive force in which is the sum of the electro-motive forces of the two disks.

I would call attention to the obvious fact that if the direction of magnetism in both fields be the same the same result as above will be obtained by driving the disks in opposite directions and crossing the connecting-belts. In this way the difficulty of securing and maintaining good contact with the peripheries of the disks is avoided and a cheap and durable machine made which is useful for many purposes—such as for an exciter for alternating-current generators, for a motor, and for any other purpose for which dynamo-machines are used.

The specific construction of the machine which I have just generally described I have illustrated in the accompanying drawings, in which—

Figure 2:
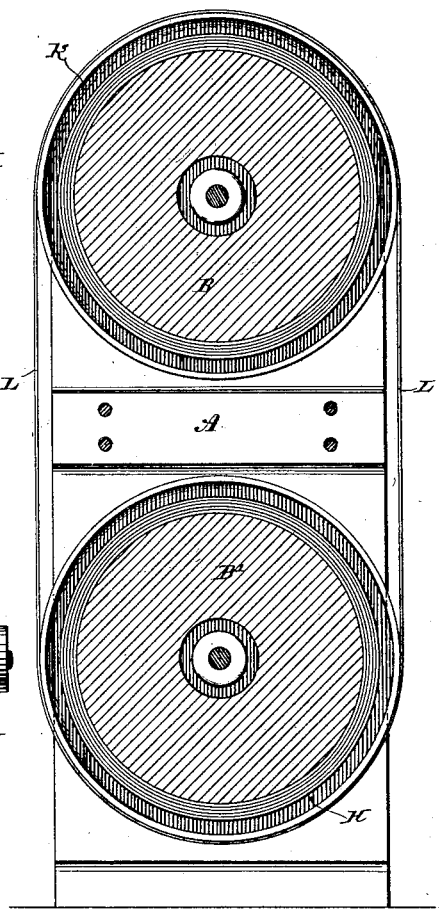

Figure 1 is a side view, partly in section, of my improved machine. Fig. 2 is a vertical section of the same at right angles to the shafts.

In order to form a frame with two fields of force, I cast a support A with two pole-pieces B B' integral with it. To this I join by bolts E a casting D, with two similar and corresponding pole-pieces C C'. The pole-pieces B B' are wound or connected to produce a field of force of given polarity, and the pole-pieces C C' are wound or connected to produce a field of opposite polarity. The driving-shafts F G pass through the poles and are journaled in insulating-bearings in the casting A D, as shown.

H K are the disks or generating-conductors. They are composed of copper, brass, or iron and are keyed or secured to their respective shafts. They are provided with broad peripheral flanges J. It is of course obvious that the disks may be insulated from their shafts, if so desired. A flexible metallic belt L is passed over the flanges of the two disks, and, if desired, may be used to drive one of the disks. I prefer, however, to use this belt merely as a conductor, and for this purpose may use sheet steel, copper, or other suitable metal. Each shaft is provided with a driving-pulley M, by which power is imparted from a counter-shaft.

N N are the terminals. For sake of clearness they are shown as provided with springs P, that bear upon the ends of the shafts. This machine, if self-exciting, would have copper bands around its poles, or conductors of any kind—such as the wires shown in the drawings—may be used.

I do not limit my invention to the special construction herein shown. For example, it is not necessary that the parts be constructed in one machine or that the materials and proportions herein given be strictly followed. Furthermore, it is evident that the conducting belt or band may be composed of several smaller bands and that the principle of connection herein described may be applied to more than two machines.

What I claim is—

1. An electrical generator consisting of the combination, with two rotary conductors mounted in unipolar fields, of a flexible conductor or belt passing around the peripheries of said conductors, as herein set forth.

2. The combination, with two rotary conducting-disks having peripheral flanges and mounted in unipolar fields, of a flexible conducting belt or band passing around the flanges of both disks, as set forth.

3. The combination of independent sets of field-magnets adapted to maintain unipolar fields, conducting-disks mounted to rotate in said fields, independent driving mechanism for each disk, and a flexible conducting belt or band passing around the peripheries of the disks, as set forth.

NIKOLA TESLA.

Witnesses:
PARKER W. PAGE,
ROBT. F. GAYLORD.